Figure 1:
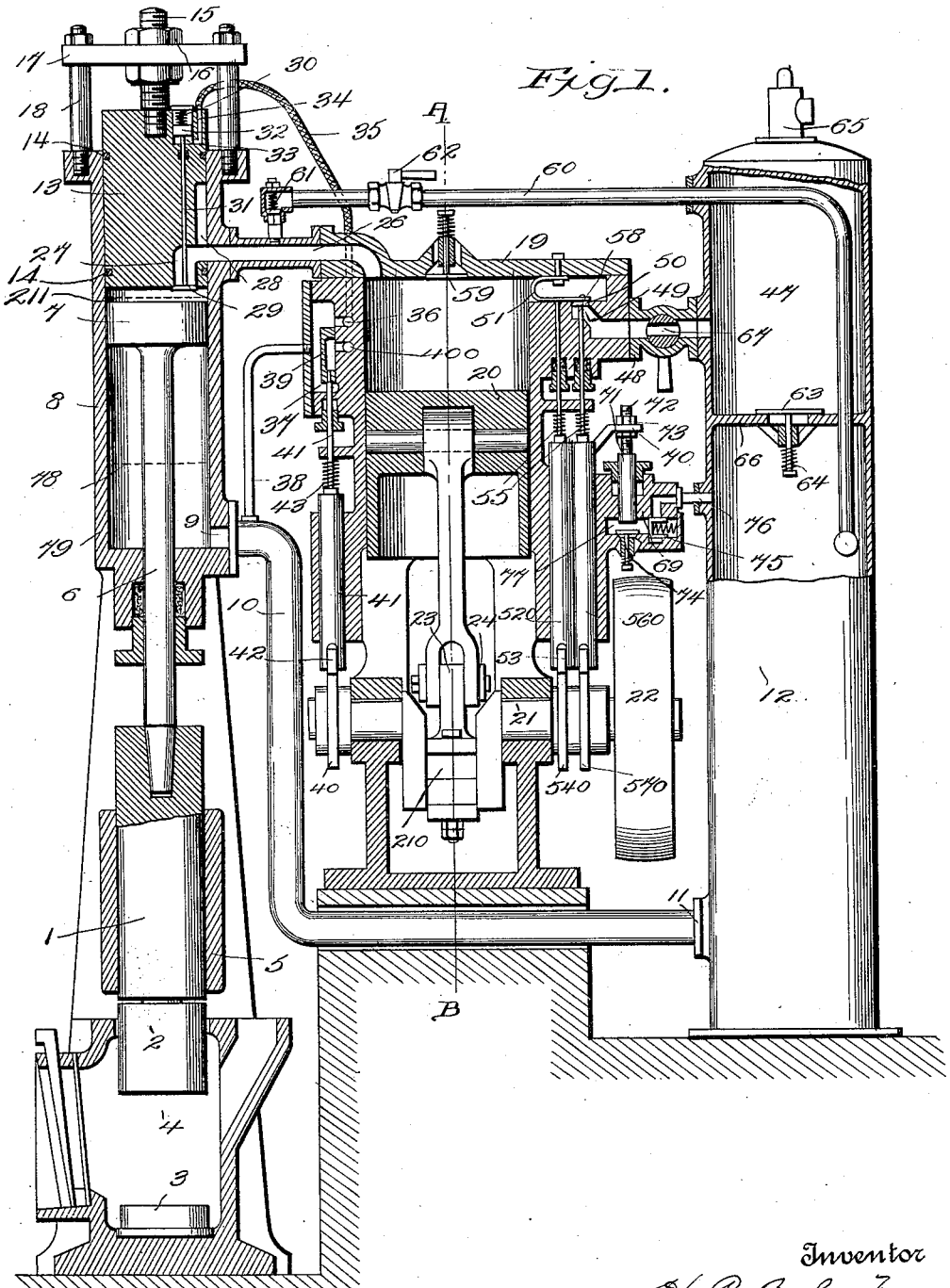

H. C. BEHR.
PERCUSSIVE APPARATUS.
APPLICATION FILED OCT. 5, 1912.

1,071,387.

Patented Aug. 26, 1913.
6 SHEETS—SHEET 1.

Witnesses
Edwin J. Beller.
Byron B. Collings.

Inventor
H. C. Behr by
Wilkinson Fisher &
Witherspoon
Attorney

H. C. BEHR.
PERCUSSIVE APPARATUS.
APPLICATION FILED OCT. 5, 1912.

1,071,387.

Patented Aug. 26, 1913.
6 SHEETS—SHEET 2.

Witnesses
Edwin J Beller
Byron B Collings

Inventor
H. C. Behr
Wilkinson Fisher
Witherspoon
Attorney

H. C. BEHR.
PERCUSSIVE APPARATUS.
APPLICATION FILED OCT. 5, 1912.

1,071,387.

Patented Aug. 26, 1913.
6 SHEETS—SHEET 3.

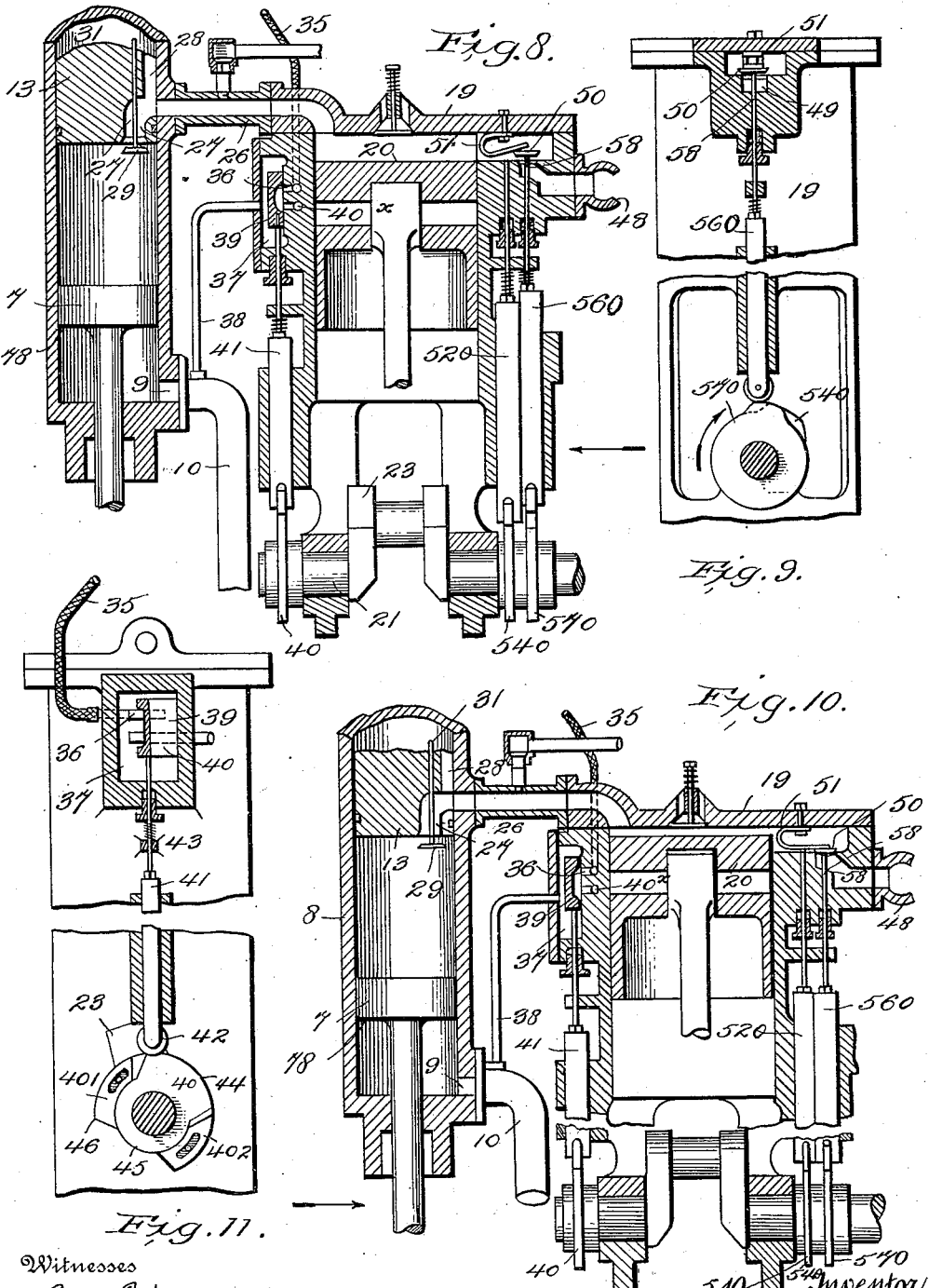

H. C. BEHR.
PERCUSSIVE APPARATUS.
APPLICATION FILED OCT. 5, 1912.

1,071,387.

Patented Aug. 26, 1913.
6 SHEETS—SHEET 5.

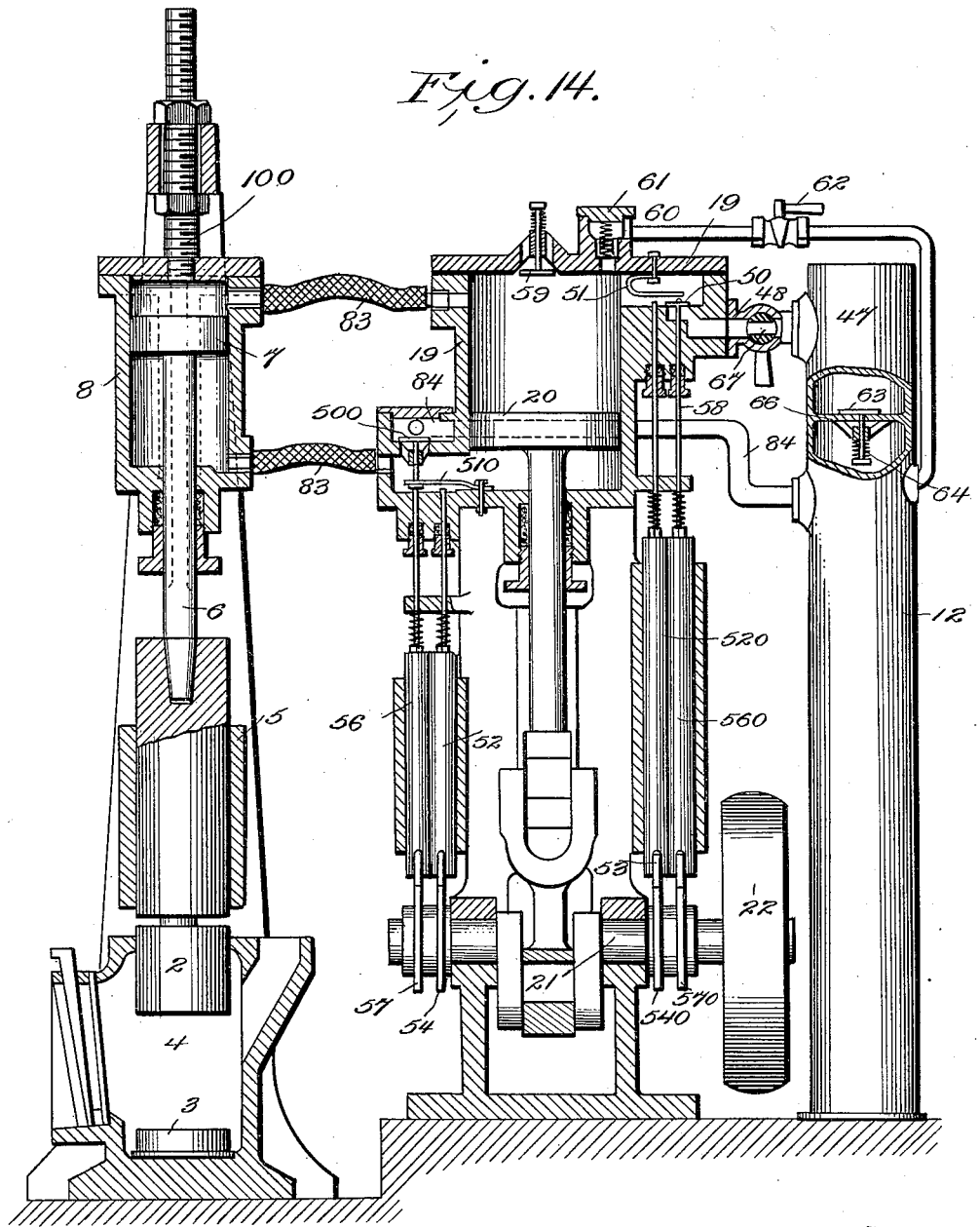

UNITED STATES PATENT OFFICE.

HANS CHARLES BEHR, OF JOHANNESBURG, TRANSVAAL.

PERCUSSIVE APPARATUS.

1,071,387.  Specification of Letters Patent. Patented Aug. 26, 1913.

Application filed October 5, 1912. Serial No. 724,117.

*To all whom it may concern:*

Be it known that I, HANS CHARLES BEHR, a citizen of the United States, residing at Johannesburg, Transvaal, South Africa, have invented certain new and useful Improvements in Percussive Apparatus; and I do hereby declare the following to be a full, clear, and exact description of the invention, such as will enable others skilled in the art to which it appertains to make and use the same.

The present invention relates to percussive apparatus generally, and particularly to ore stamps of the kind embodying a positively reciprocated piston, which, through air pressure, actuates a striking member, and constitutes an improvement over the apparatus made the subject of my pending applications No. 660,250, and No. 661,296, now Patents No. 1,048,275 and No. 1,038,521 respectively.

In order to produce an efficient ore stamp or similar apparatus of high capacity, the joint presence of certain important features hereinafter referred to, is highly desirable. Thus, the air should be utilized at pressures well above atmospheric pressure to enable the whole apparatus, and particularly the piston areas and cylinder volumes, to be kept within the practical limits of construction, and also to attain the quick action of the compressed air volumes due to the rapid variation of pressure with respect to volume which occurs at high pressures.

Furthermore, the fluid cycle should be a closed one; that is to say, the fluid should preferably not be exhausted to the atmospheric pressure. Non-observance of this condition may lead to a serious waste of energy in the exhaust which may in some cases, more than counter-balance the benefits derived from working at high pressures within the cycle. Moreover, in general, the air should be so utilized that it does not expand into regions of substantially lower pressure except where other advantages gained thereby make a small sacrifice of air efficiency advisable.

When the striking member, or stamp head, is making its forward or downward stroke, and particularly when its weight is added to the propelling force of the air, its speed tends to accelerate and thus permit the air behind or above its piston, to expand. This causes the air in front thereof, or below the same, to compress to such an extent that the driving force is greatly lessened before the instant of striking the blow, and the latter is thereby cushioned or retarded. Such cushioning or retardation should obviously be avoided as by the admission of air behind the percussive piston (or alternatively withdrawing it from the front thereof) to obviate such cushioning, but special precautions in such cases, are necessary to avoid any obstacle to the rapid return of the striking member after the blow is struck.

A prompt return or minimum dwell of an ore stamp upon the die is, of course, an important desideratum, as will be apparent when it is considered that the dwell of pneumatic stamps prior to my inventions, has probably amounted in time up to fifty per cent. of the cycle and that during that time, the effective operation of the apparatus is suspended. By reducing the dwell, either the number of strokes per minute may be increased, or the ore is given more time to settle into position on the die for the next blow.

It is further well known that the operation of an ore stamp causes the stamp head and the die to wear away rapidly. It is accordingly desirable to provide an efficient and at the same time, a simple means for preventing any disturbance of the cycle due to this wear.

The present invention consists in a percussive apparatus, which enables the above advantages to be attained, as well as in the method of operation involving certain principles as will now appear.

The invention is illustrated by the accompanying drawings forming a part of this specification, in which:—

Figure 2:
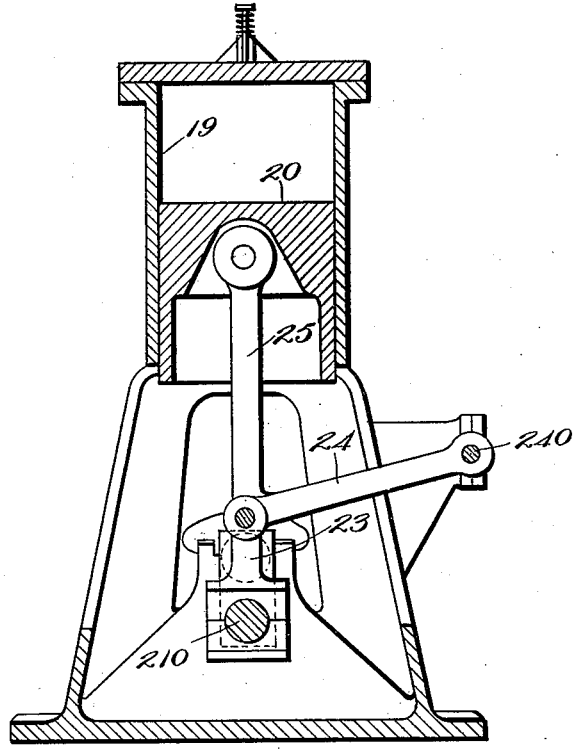
Figure 3:
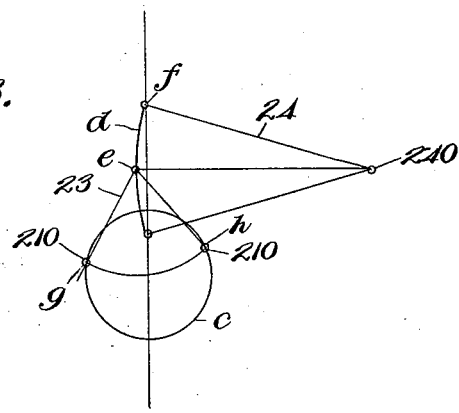
Figure 4:
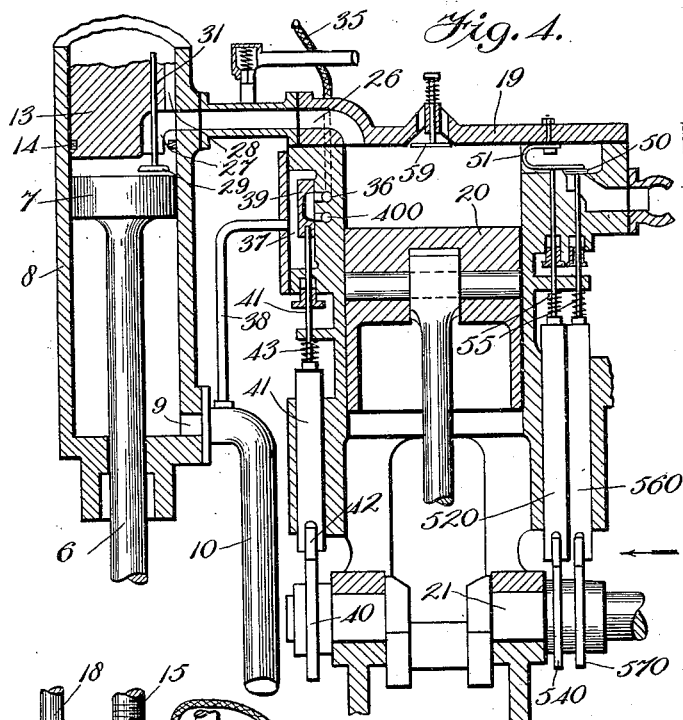
Figure 5:
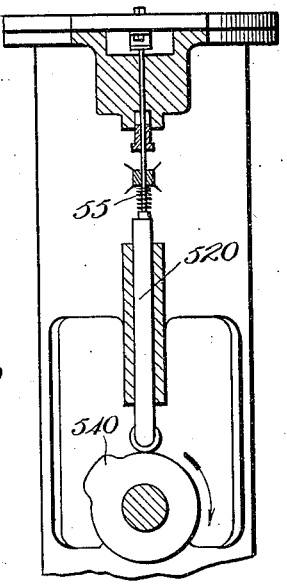
Figure 6:
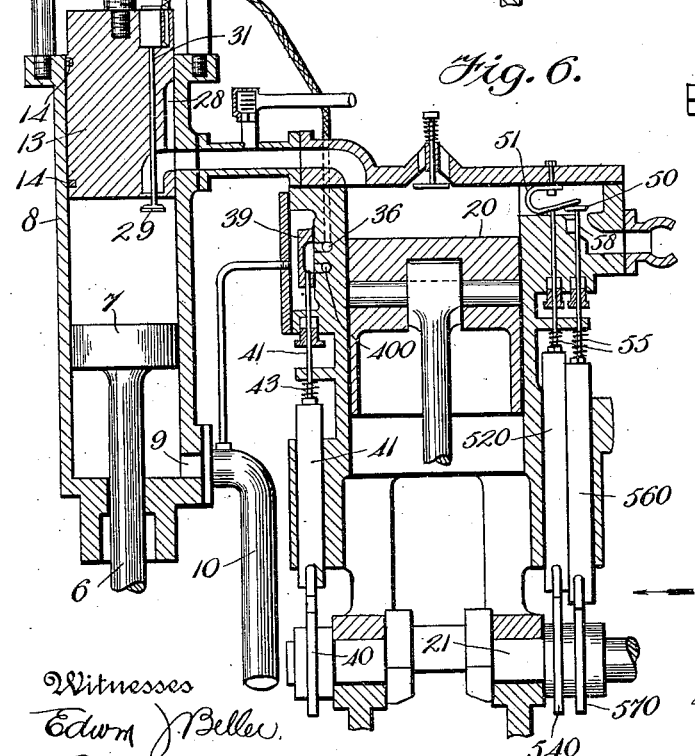
Figure 7:
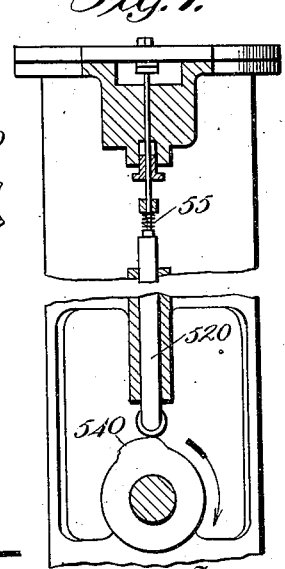
Figure 12:
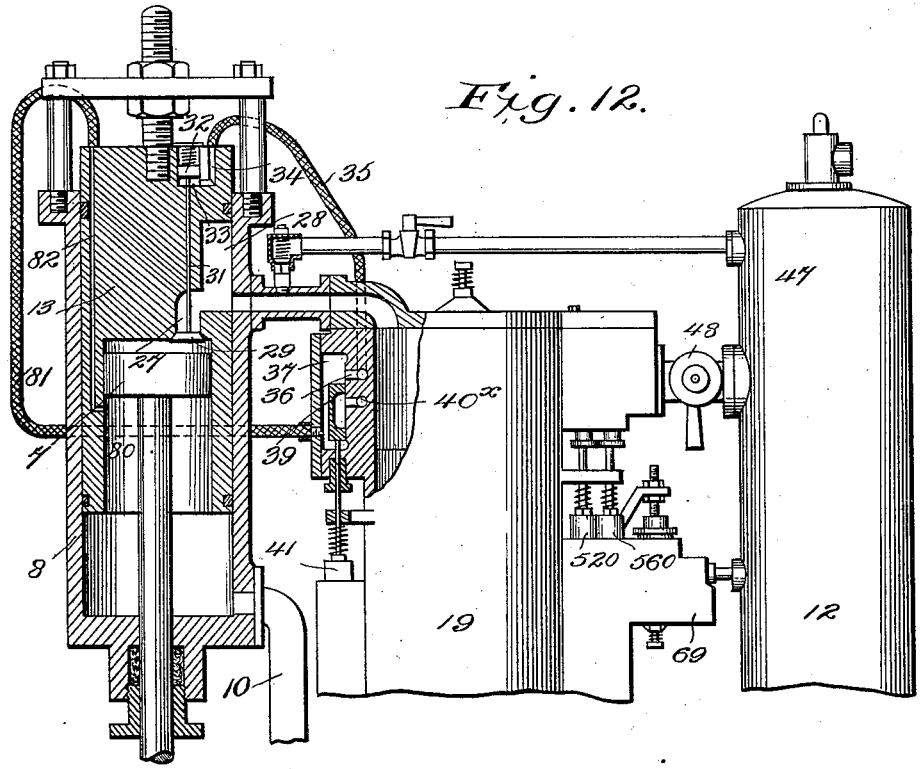
Figure 13:
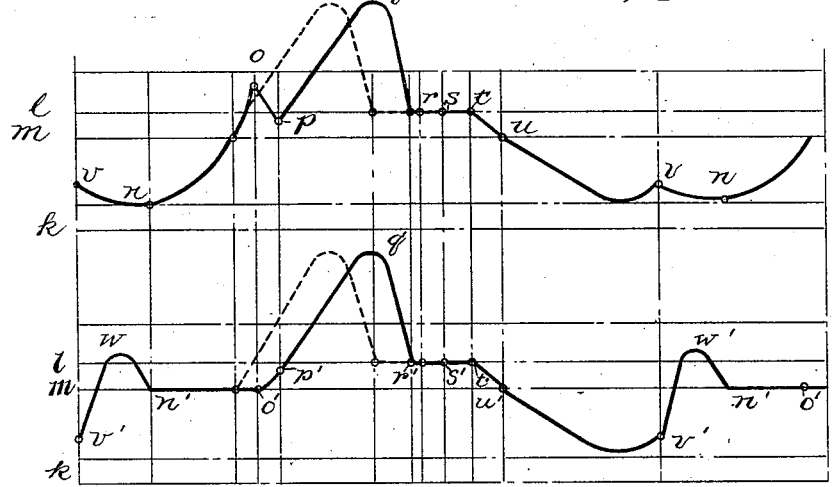

Figure 1 is a sectional view illustrating an ore stamp embodying my improvements, showing the actuating piston 20 in its lowest position, about to begin its upward stroke and the stamp piston 7 just before it begins its downward stroke; Fig. 2 is a sectional view of a portion of the parts shown in Fig. 1, on line A—B of said figure; Fig. 3 is a diagrammatic view to illustrate the operation of the mechanism of Fig. 2; Fig. 4 is a view of certain of the parts shown in Fig. 1, but showing their relative positions at the instant of beginning the down stroke of the stamp piston 7; Fig. 5 is a detail side elevation of certain of the parts looking in the direction of the arrow in Fig. 4, and showing the angular position of the cam 540 at the period when a portion of the upward stroke of the piston 20 has been completed; Fig. 6 is a view similar to Fig. 4, but showing the relative positions of the parts during the latter part of the upward stroke of the piston 20 and after the valve 50 has opened to admit air from the reservoir 47 to the space above the pistons; Fig. 7 is a side elevational view looking in the direction of the arrow in Fig. 6, and showing the angular position of the cam 540 just before the piston 20 reaches the position shown in Fig. 6, and just after the valve 50 opens; Fig. 8 is a view similar to Fig. 5, but showing the positions of the parts when the stamp piston 7 has completed its stroke and the valve 50 is being held open by the rod 560; Fig. 9 is a side elevational view looking in the direction of the arrow in Fig. 8, showing certain of the parts and the angular relations of the cams 540 and 570 when the piston 20 has reached the position illustrated in said Fig. 8; Fig. 10 is a view similar to Fig. 5, but showing the relation of the parts when the actuating piston 20 has reached the limit of its upward stroke, and valve 50 has closed; Fig. 11 is a view from the opposite side of the apparatus from that of Fig. 9, and showing the angular position of the cam 40 and its coacting parts; Fig. 12 shows a modified construction of the apparatus; Fig. 13 is a diagram showing pressure time curves illustrating the principles of the invention; and Fig. 14 is a view of a still further modified form of my invention.

As intimated above, it is well known when a vertically traveling piston, such as that of an ore stamp, or hammer, is subjected to the action of compressed air immediately preceding the blow, that the piston is continually impelled downward not only by the expansion of the air, but also under the action of gravity, so that its velocity increases as it progresses. It is also well known that the power of the blow increases as the square of this velocity and that therefore it becomes of the greatest importance to maintain this said velocity by preventing any cushioning or retardation of the downward stroke. Further, it often happens that the above acceleration causes the stamp piston to travel so fast that the propelling air above the same becomes actually rarefied, and its pressure falls below the effective pressure upon the opposite face of the piston, in which case, of course, the blow is greatly retarded unless some preventing means is adopted. The same evil results occur, though to a less degree, even in crank propelled pistons traveling horizontally in which case, although gravity plays no part, yet the very great speed due to the crank at one portion of its rotation, causes the piston to over-run the air and the latter to be rarefied. It is also well known that various devices have been heretofore proposed, which involve the employment at one period or another of compressed air to return the pistons as well as to accelerate them downward. But, in all such cases, so far as I am aware, either the blow is cushioned, or much energy is wasted, and it results that the crushing capacity is either reduced or it is maintained at a high cost. By my method, on the other hand, all of these objections are overcome, and in order to render its principles clear, I have illustrated it by a plurality of different constructions, selecting for convenience, the case of ore stamps; but it will be understood that the invention, as above stated, is broadly applicable to percussive apparatus in general.

Referring to Fig. 1 of the drawings:—1 represents the stamp head carrying a shoe 2, and 3 the die adapted to coöperate with said shoe. 4 represents the usual mortar box, and 5 a guide sleeve or other means for guiding the head 1. The piston rod 6 is secured by any suitable means to the stamp head 1 and carries at its other end the piston 7 free to move within the cylinder 8. At the front, forward or lower end of the cylinder 8 there is provided a port 9 from which a pipe 10, preferably where joined to 9, of non-rigid construction, connects. At 11 said pipe also connects with a compressed air reservoir 12. The reservoir 12 is preferably of such a size or character that its volume is many times that of the cylinder 8, and therefore, the reciprocation of the piston 7 does not materially compress or expand the air in said reservoir, although the pressure maintained in the same is preferably above that of the atmosphere. In order to keep the stroke of piston 7 and the clearance volume above said piston, constant as the shoe 2 and die 3 wear down, the cylinder 8 is provided at its upper end, as seen in Fig. 1, with a movable head such as 13, provided with a suitable packing, such as 14, and capable of being adjusted into and out of the cylinder by means of the screw 15 passing through the lock nuts 16, and the yoke 17 carried by the pillars or supports 18 secured to said cylinder 8. 19 is the actuating cylinder in which works the actuating piston 20 operated by the crank shaft 21 and power pulley 22. As will be more fully explained hereinafter, it is desirable to accelerate the velocity of piston 20 during the latter part of its upward stroke and the first part of its downward stroke, i. e., to reduce the period of time during which piston 20 is near the upper end of its stroke as compared to the time it is at or near the lower end of its stroke. To this end I have provided an apparatus which constitutes one of the improvements over my prior inventions above referred to, and it consists of a very short connecting rod 23, the upper end of which is guided by a link 24 pivoted to said rod and to the frame as at 240 (see Fig. 2). Connection of the rod 23 to the piston 20 is made by a second link or pivoted connecting rod 25. The upper ends of cylinders 8 and 19 are connected by a pipe 26 which, like pipe 10, is preferably of a yielding nature in order to minimize the transmission of vibration from the stamp cylinder 8 to the actuating cylinder 19 and other parts of the apparatus. Said pipe 26 connects to a port 27 and a recess or passage 28 formed in the movable head 13; the extension 28 being adapted to maintain the communication as said head is moved down in the cylinder 8. Said port 27 is furnished at or near to its end remote from cylinder 19, with a valve 29 opening inwardly to cylinder 8, and provided with a spring 30, or its equivalent, tending to open it. The valve spindle 31 is fitted with a small piston 32 working in a piston chamber 33 formed in the head 13. A port 34 leading to the space beneath piston 32 is connected by a flexible pipe 35 to a port 36 which may conveniently be positioned in the wall of cylinder 19. The latter port 36 opens to a valve chest 37, to which air is supplied by a pipe 38 joined to pipe 10, as shown. A slide valve 39 opens the port 36 to pressure from said valve chest, and thereupon causes the valve 29 to be closed against the pressure of its spring 30. Said slide valve also connects said port 36 with the exhaust port 400 thereby permitting air to escape from the chamber 33 and causing said valve 29 to be opened by its spring 30.

The members just described numbered from 29 to 39, and their coacting parts, constitute another important improvement over my former inventions, which will appear more clearly hereinafter. The motion of the slide valve 39 is derived from a cam 40 on the crank shaft 21 through a sliding rod 41 having a roller 42 at its lower end to press upon the cam 40, and a spring 43 which maintains the contact between said roller and said cam. The form of cam 40 is clearly shown in Fig. 11. Its periphery comprises a raised arcuate portion 44 which operates to lift the slide valve 39, and therefore to effect the opening of valve 29. Said cam is also provided with a depressed portion 45 which permits the valve 39 and rod 41 to drop and so controls the closing of valve 29. It will be seen that the raised portion 44 occupies the greater portion of the circumference and its leading end 46 is in such angular relationship with the crank 23 that the valve 29 is caused to open when the piston 20 has moved so far on its upward stroke that it has compressed the air above it to a higher pressure than that existing above piston 7. In order to permit the time of the opening of valve 29 to be adjusted relatively to the phase of piston 20, said leading end 46 may be formed upon a portion 401 of the cam which is angularly adjustable relatively to the remainder of the cam. In order that the closure of the valve 29 may also be made adjustable, the tail end 402 of the raised portion 44 is also made adjustable in a similar manner to the leading end.

47 is a reservoir containing air at a lower pressure than that in reservoir 12; and communication between said reservoir 47 and the upper end of cylinder 19 is afforded by the pipe 48 and the port 49. Said connection is controlled by a valve 50; and for holding said valve to its seat, there is provided a spring 51 sufficiently stiff to hold the valve closed against any air pressure, tending to lift it, which can occur in the usual operation of the stamp. A rod 520 is provided to lift the spring 51 at predetermined intervals, for which purpose it is furnished with a roller 53 working on a cam 540 fast to the crank shaft 21, and kept in contact with the same by a spring 55. A similar rod 560 actuated by cam 570 is adapted to make contact with the stem 58 of valve 50 to lift the latter.

In the head of cylinder 19 is a spring controlled inlet valve 59 for admitting the air necessary for charging the system at the commencement of operations, as will appear hereinafter. A pipe 60 fitted with a non-return valve 61 and a shut-off cock 62, is provided to convey such air to the reservoir 12 instead of to the reservoir 47, as in my previous inventions; and from said reservoir 12 some air will eventually pass to reservoir 47 past the valve 63, the spring 64 of which is regulated to cause the pressure in tank or reservoir 47 to be slightly less than that in tank or reservoir 12 to the required extent.

65 is a relief valve for the reservoirs.

67 is a shut-off cock for pipe 48.

Since the leakage of air during the operation of any closed system employing fluids under pressure is inevitable, I provide a means for automatically making up for any losses of this nature, and for this purpose I have shown a small compressor 69. Said compressor may be operated from any suitable moving part connecting with the actuating cylinder 19, but as shown, it is operated from an extension 70 of the rod 560. The compressor plunger 71 has a screw rod extension 72 by which it is adjustably connected through the nuts 73 to the lateral extension 70 above mentioned.

The spring controlled inlet valve 74 is provided near the lower end of the cylinder 69, and a spring controlled outlet valve 75 is also provided, and in turn controls a connection 76 between the said cylinder 69 and the reservoir 12. The plunger 71 is adjusted by means of the nuts 73 to such a height that when the lower end of its stroke is reached, a clearance space 77 will be formed in the compressor cylinder 69. This clearance space is chosen of such a volume that when the air left in said space is expanded from the pressure which it is intended to maintain in the reservoir 12 by the additional volume due to the stroke of the plunger 71, the pressure in said space will fall to such a point that the atmosphere will open the valve 74. It, therefore, results from this that the outer air will not enter the cylinder 69 until the pressure in the reservoir 12 falls below a predetermined point because, otherwise, the pressure in the space 77 would not permit the valve 75 to open. But, the said valve 74 will open and permit air to enter when the pressure in said reservoir 12 does fall below said predetermined amount, because, in that case, the piston 71 on its up stroke will reduce the pressure of the air left in the space 77 to a point below the atmospheric pressure. Of course, whenever air enters the cylinder 69, it is immediately compressed and forced past the valve 75 into the reservoir 12, and thereby restores the pressure in said reservoir.

As the shoe 2 and die 3 wear, the lower limits of the travel of the piston 7 will constantly approach the lower end of the cylinder 8, and therefore, in order to keep its displacement constant, it is necessary to provide a sufficient extension of cylinder 8, below the normal travel of the piston 7, and to lower the plug 13 into said cylinder 8. The extension is indicated in Fig. 1 by the length 79 of the cylinder below the dotted line 78, which represents the lower limit of the travel of piston 7 before the shoe and the die wear.

The operation of my stamp is as follows:—The system is first charged with compressed air, and in accomplishing this I prefer to raise the piston 7 into the position shown in Fig. 1, and to place a block, not shown, between the shoe 2 and the die 3 in order to support said piston in its elevated position. Cock 62 is opened and cock 67 closed. The piston 20 is then brought to its extreme upper position and thereafter caused to descend to the position shown in Fig. 1. As the said piston 20 descends, air is sucked in past the valve 59, and upon forcing said piston 20 upwardly again, the air thus taken in is forced past the valve 61, through the cock 62 and into the reservoir 12, whence some eventually passes at lower pressure into reservoir 47. The piston 20 is repeatedly reciprocated until the said reservoirs 12 and 47 become charged to the predetermined pressures, which will be indicated by the blow-off of the safety valve 65. The block, not shown, is removed from the shoe 2, and the said shoe allowed to rest upon the die 3, while cock 62 is closed and cock 67 opened. Valve 59 is provided only to permit this preliminary filling and does not operate during the regular work of the stamp.

The continuous operation of the apparatus will be in accordance with the following description, from which the process involved in the invention will also appear.

Referring to Fig. 1, the valve 50 is held closed by a predetermined pressure due to spring 51, and valve 29 is held closed by a predetermined pressure due to the compressed air from pipe 10 through pipe 38, valve chest 37, and pipe 35 to chamber 33. Therefore, the piston 7 will have more pressure below it than above it, for the instant when the piston 20 is in the position shown. Accordingly, the said piston 7 may be held at the upper end of its stroke owing to the excess of pressure below it, while the piston 20 is moving upward, and compressing the air, all as will more clearly appear hereinafter. When, however, piston 20 has risen say to the position shown in Fig. 4, and thereby compressed the air above it to a predetermined pressure, the valve 29 opens. Such opening may occur at any time when the pressure above said valve 29 sufficiently exceeds that below it, and by an amount necessary to overcome the effective pressure on the lower side of the small piston 32; but whether such automatic opening occurs or not, a positive opening of the valve 29 at the right moment, is insured by the properly timed cam 40 raising the slide valve 39 and exhausting the air from the piston chamber 33 through the pipe 35 and exhaust port 400. The pressure thus admitted from the cylinder 19 above the piston 7 causes the stamp to commence its downward stroke.

It is very desirable, of course, as above stated, to deliver the heaviest blow possible, and in order to do this, the piston 7 should gain in velocity, or at least not lose the highest velocity gained, until it strikes its blow. But, piston 20 reaches its maximum velocity or is at about mid-strike, during the early part of the downward stroke of piston 7, and after passing its mid-stroke, owing to its crank derived motion, the said piston 20 of necessity loses velocity up to the end of its upward stroke. In other words, at the instant when the velocity of the piston 20 and the pressure of the air it supplies to piston 7, should be at its maximum, this said velocity begins to fall off, and this occurs when the increasing displacement of the piston 7 begins to require even a greater velocity on the part of piston 20, if the pressure in cylinder 8 is to be kept up. That is to say, the air which was compressed by the said piston 20 tends to expand above the piston 7; and since the velocity of the piston 7 continues to increase, and the velocity of the piston 20 continues to decrease, there will come a period during the strokes of both pistons when the total volume of air inclosed behind or above them will increase. From this period on, therefore, instead of a compression taking place, there will be a loss of pressure due to an expansion of the air behind both pistons; and it is clear, unless something prevents, such expansion would cause the pressure above the piston 7 to fall to such a degree that the compressed air below said piston would exert an effective retarding action and cause the said piston to have a lower final velocity and to deliver a correspondingly weaker blow than would otherwise be the case. Were the maintenance of adequate air pressure above piston 7 the sole object in view, it could readily be attained by, for instance, increasing the volume of cylinder 19 so that the supply therefrom never falls below what would be required by the piston 7. This expedient however, would result in the serious drawback that there would remain above both pistons 7 and 20, an excessive volume of air which, until withdrawn from cylinder 8 by piston 20, would delay the re-raising of the stamp and so prolong the dwell on the die which it is one of the objects of this invention to diminish. The method I have adopted to meet these opposing conditions, consists in admitting air automatically above the pistons 20 and 7 through the valve 50 from the reservoir 47 whenever the pressure above said pistons drops to a given point, and sweeping out the extra air so admitted during the latter part of the upstroke of piston 20 so that no excess remains to delay the recovery of piston 7, as will now appear.

In order to accomplish the admission of reservoir air above the pistons automatically at the critical moment, and thereby prevent the constant pressure below the piston 7 from cushioning its downward stroke, the parts are so timed that during the continued upward movement of the piston 20 the pressure of the spring 51 is taken off the valve 50 by the rod 52, as illustrated in Figs. 6 and 7, before the pressure above the pistons falls to that in the reservoir 47. It results from this that the said valve 50 will open whenever the pressure in cylinder 19 falls slightly below that in reservoir 47. The opening of the valve 50 causes the air from the said reservoir to maintain the required pressure above said piston 7. When this said valve 50 opens, we have the pressure of the reservoir 47 above piston 7, and the pressure of the reservoir 12 below the said piston, so that if the two pressures were identical, and the two reservoirs in free communication with each other, the said piston 7 would fall freely without any retardation at all. As stated above, these pressures are only slightly different, and the reservoirs, which are very large in comparison with cylinder 8, are in communication through the valve 63, so that in practice it follows that the piston 7 completes its stroke without any effective retarding pressure beneath it. But, as was also stated above, the said piston 7 strikes its blow and comes to rest owing to its high velocity, before the piston 20 has completed its upward stroke, so that there is now more air above the pistons than there was when the cycle of one full revolution began with the piston 20 at the extreme end of its upward stroke. Consequently, the air taken in from reservoir 47, during the downward stroke of the piston 7 must be expelled past the valve 50 and forced back into the reservoir 47 during the completion of the upward stroke of piston 20. In order to accomplish this with the least loss of power, the valve 50 must be prevented from closing automatically upon the beginning of the expulsion of air back into the reservoir 47. Therefore, the rod 560 has been provided and the parts are further so timed, as illustrated in Figs. 8 and 9, that the cam 570 prevents the said valve 50 from closing until the piston 20 has reached the end of its upward stroke. While the said piston 20 is thus completing its upward stroke, it reduces the said larger volume of air above the two pistons by forcing the excess back into the reservoir 47. The said cam 570 has now moved sufficiently to permit the rod 560 to fall, and the valve 50 to close (see Fig. 10). There is then the same pressure above the pistons as in the reservoir 47 and also the same amount of air as at the commencement. If we now consider the descent of piston 20, remembering that the piston 7 is at its lowest position, and that valve 29 still remains open, as shown in Fig. 10, it will be clear that as the said piston 20 moves downward, the relatively small volume of air in the cylinder 19 and above piston 7 will at first continually diminish in pressure. It will therefore be readily understood that a point will soon be reached at which the pressure of the said air above the pistons 7 and 20 will be sufficiently small to permit the compressed air below the piston 7 to lift the same. It will now also be clear that while the piston 7 must dwell at the end of its downward stroke for a brief period while the piston 20 begins to move downwardly, the reëxpulsion of the additional air previously admitted permits such dwell to be reduced to a minimum. Before piston 7 reaches the top of its stroke, cam 40 causes the slide valve 39 to admit air below the small piston 32 and so causes valve 29 to close, as shown in Fig. 1. The air remaining above piston 7 is thereby trapped and acts to cushion piston 7 as the latter moves up to the dotted line 211, Fig. 1. It will, however, reëxpand immediately down to the effective lifting force of the air below, since the air pressures above and below piston 7 and the weight of the stamp will come into equilibrium. It, therefore, follows that piston 7 will descend to its full line position in Fig. 1, and that the stamp will remain practically stationary for a period at the upper end of its working stroke. The cycle of operations is thus completed.

It will now be apparent that valve 29 provides a means of causing the stamp to dwell at the top of and delay the commencement of its working stroke for a period depending upon the lateness of opening of valve 29. This action, of course, correspondingly reduces the dwell at the lower end of the stroke and so gives the ore ample opportunity to pass into position on the die 3. Moreover, while said valve remains closed during the rising of piston 20, the pressure increases in cylinder 19, which, upon the opening of the valve 29 gives an immediate impetus to piston 7 and thus increases the effectiveness of the blow. Furthermore, these advantages are gained without any substantial loss of energy due to releasing air into a region of lower pressure, because the volume into which the high pressure air passes is very small, being only the space remaining above the piston 7 when the latter is suspended at the top of its working stroke. It is in order to reduce this volume to the minimum that valve 29 is located as shown, on the underside of the adjusting head 13, so that it may be kept at all times as near as possible to piston 7.

The method of maintaining the forward or downward maximum velocity of the stamp while reducing its dwell on the die, by admitting additional air to make up for the loss in velocity during the last half of the upward stroke of the piston 20, and during the down stroke of piston 7 and also expelling the same before the down stroke of piston 20, has already been referred to. But, in order still further to assist the attainment of this object, the motion of piston 20 is accelerated just before and after reaching the top of its stroke by means comprising the very short connecting rod 23 and pivoted link 24, already described. The principle of the operation of this construction is illustrated in Fig. 3, in which the circle "$c$" represents the path of the crank pin 210, and arc "$d$" the path of the lower end of connecting rod 25. Supposing the crank pin 210 to revolve at a uniform rate, the upper half of path "$d$" viz. from point "$e$" to point "$f$" and back again, will be traversed while the crank pin is moving through the upper part of its path from point "$g$" to point "$h$" which latter distance is appreciably less than half the revolution of the crank. It, therefore, follows that the speed of the piston 20, as it completes its upward stroke and begins its downward stroke, is increased. The link 24 reduces the friction due to side thrust of the connecting rod, so that the latter may be made much shorter than would be possible with the usual guides. This construction permits the connecting rod 23 to be shortened to even less than the diameter of the crank circle.

In the modified construction shown in Fig. 12, the piston 7 works actually in the head 13, which is extended downward to form a chamber 80 for this purpose. With this construction, the closing of valve 29 may be controlled by the piston 7. This enables the piston 7 to be properly cushioned with the minimum of clearance above it for the air from cylinder 19 to pass into, and without danger on the one hand of the piston 7 striking the head 13, or on the other hand, of cushioning too soon and thereby curtailing the stroke of piston 7, which might occur if the movement of slide valve 39 were faultily adjusted. In this modification, the air supply to the valve chest 37 is delivered from the air body below piston 7 by means of the flexible pipe 81 and the passage 82, through the head 13. The opening of said passage 82 to chamber 80 is so positioned that it is uncovered by the lower edge of piston 7 when said piston has reached the position on its upward stroke at which it is desired to begin to cushion it. In operating this form of the invention, cam 40 is timed to uncover port 36, during the time that passage 82 is covered by piston 7 on its upward stroke. Communication is thus established between passage 82 and the piston chamber 33; and, upon the piston 7 moving farther upward, and uncovering passage 82, air passes from below said piston to said piston chamber 33 and closes the valve 29.

In order to render the exact principles of the invention clear, the cycle of operations is illustrated graphically in Fig. 13, which shows curves obtained by plotting pressures as ordinates and time as abscissæ. The upper curve shows the variations of pressure in the upper end of cylinder 19 and the lower curve the corresponding pressures in the upper end of cylinder 8. In each diagram line "$k$" represents zero pressure. The ordinates of the curves above said line "$k$" are proportional to the pressure per unit area above the pistons. Line "$l$" represents the pressure in the reservoir 47 to the same scale of ordinates as the curves. Line "$m$" represents the effective pressure tending to raise the piston 7. To represent this effective lifting pressure on the scale of the diagram, the total fluid pressure under the piston 7 less the weight of the stamp is divided by the area of the top of the stamp piston and the result gives the ordinate of line "$m$". Point "$n$" in the upper curve corresponds with the commencement of the upward travel of piston 20. From point, or period, "$n$" the pressure increases up to point or period "$o$", when valve 29 opens and the pressure drops somewhat due to air flowing from cylinder 19 into cylinder 8. Equilibrium is established between the cylinders at point "$p$" from which point the pressure rises again to point "$q$". Here the increasing velocity of piston 7 causes the pressure to drop until its value is equal to that of the air in the reservoir 47, which condition is represented by point "$r$". Valve 50 then opens and the air flows in to maintain the pressure until the point "$s$" is reached, which corresponds in time with the blow of the stamp. The valve 50 still remaining open, the pressure remains constant until the piston 20 completes its upward stroke at the period or point "$t$". Valve 50 having closed at this point, the downward movement of piston 20 now causes the pressure to fall and the curve descends correspondingly. The point "$u$" where it crosses line "$m$", indicates the commencement of the upward travel of the stamp. Toward the end of the downward stroke of piston 20, piston 7 may gain so much velocity owing to its momentum that the volume above the pistons is reduced, causing the pressure to rise to the value indicated at point $v$. Here valve 29 closes and the pressure in cylinder 19 again falls until the downward stroke of piston 20 is completed at the period $n$.

Considering now the lower curve in Fig. 13, in which $n'$, $o'$, $p'$, $q'$, $r'$, etc., represent the same points or periods of time as the corresponding letters $n$, $o$, $p$, $q$, $r$, etc., in the upper curve, it will be seen at once that the period between the points $n'$ and $o'$ represent the dwell of the piston 7 at the upper end of its working stroke after it has been cushioned and brought to rest, and $v'$ to $o'$ represents the total period of dwell at said upper end including the cushioning period. At point $o'$ the valve 29 opens and the pressure rises to the value at $p'$ when equilibrium is established. Thence-forward the curve is identical with the corresponding part of the upper curve until the point $s'$ is reached which corresponds to the end of the stroke of piston 7 or to the striking of the blow. Immediately after the blow is struck, the piston 20 completes its upward stroke corresponding to the point $t'$, and then begins its downward stroke, thus rarefying the air above piston 7 and causing its pressure to fall to the line $m$, indicated by the point or period $u'$, whereupon the said piston 7 begins its upward stroke. In other words, it will be seen that the total dwell of the piston 7 at the bottom of the cylinder 8 only corresponds to the period $s'$ $u'$, while its dwell at the top of said cylinder corresponds to the period $v'$, $o'$, which is several times longer than the period $s'$ $u'$. The remainder of the curve from $u'$ to $v'$ is identical with the upper curve between $u$ and $v$. In fact the whole lower curve between the points $p'$ and $v'$ is identical with the upper curve between the points $p$ and $v$. The point $v'$ on the lower curve marks the time at which the valve 29 closes, after which the pressure, instead of immediately falling again as does the pressure in cylinder 19, rises to the point $w'$ due to the cushioning action of the energy stored in piston 7. The pressure in cylinder 8 then falls to the equivalent of the effective pressure beneath piston 7 at the point $n'$ and it now remains constant until the period $o'$ is again reached.

It will now be clear from the foregoing, by providing the members numbered from 29 to 39 and their coacting parts, I am enabled to greatly reduce the dwell at the end of the blow stroke of piston 7, while the dwell at the end of the return stroke is correspondingly increased. And it will also be evident that the provision of the parts numbered 23, 24, and 25, greatly aid in accomplishing this most desirable result. In order to emphasize this important feature of my present invention, I have indicated by the dotted lines of Fig. 13 the objectionable features of the cycle which occur when valve 29 is arranged to open immediately after the pressure in cylinder 19 rises to that in cylinder 8 instead of opening later; and it will be apparent from these said lines that the effect is to cause the dwell at the upper end of the stroke of piston 7 to be lessened and the stamp to begin its forward movement and strike its blow at an earlier period in the cycle, so that the dwell at the lower end of its stroke is undesirably increased. Expressed graphically, the portions of the curves from $p$ to $r$ and from $p'$ to $r'$ are shifted backward while points $n$ and $t$ and $n'$ and $t'$ remain unchanged. The diagram therefore clearly illustrates the great reduction of the dwell of the stamp on the die that is attained by prolonging the closure or valve 29.

The invention has hitherto been described as being single acting and having constant pressure beneath the stamp piston 7; and this is considered the preferable embodiment. However, the apparatus may, if desired, be made double acting as shown in Fig. 14 without departing from the principle of the invention. In this case, the lower extension 79 of cylinder 8 is omitted and the space beneath the piston 7 has free communication with the closed lower end of cylinder 19. Cylinder 8 is made adjustable as a whole by means of the screw rod 100 to compensate for the wear of the shoe and die and consequently the connections 83 are made flexible. Arrangements to prevent retardation of the piston 7 are made in respect to the pressure of the air between the lower faces of the pistons, precisely analogous to those in respect of the air body above the pistons as already described. That is to say, valve 500 corresponds to valve 50, spring 510 corresponds to spring 51, and pipe 84 corresponds to pipe 48. In the case of the lower air body, however, the condition to be guarded against is the reverse of that in the upper air body. In the latter case, the tendency is for the air to become unduly rarefied and consequently additional air is first admitted and afterward swept out on the completion of the stroke of piston 20. In the case of the lower air body, the tendency is for the air to become unduly compressed by the descent of piston 7, and provision is therefore made for permitting air first to be passed out to permit free movement of the piston 7 and then re-admitted after the blow is struck and while piston 20 is completing its upward stroke. For this purpose the space beneath the pistons communicates with reservoir 12 by pipe 84, and such communication is controlled by valve 500 opening toward said reservoir. A stiff spring 510 is provided and holds said valve closed. During the early part of the down stroke of piston 7, said spring is lifted by the rod 52 operated by cam 54. Consequently as soon as piston 7 begins to overrun piston 20 and thereby compress the air beneath it, valve 500 will open and permit such air to pass out into reservoir 12. Thereafter rod 56 operated by cam 57 rises and holds the valve 500 open positively, so that when the blow has been struck the expelled air may be drawn in again by the continued upward movement of piston 20. Upon completion of the upward stroke of piston 20, rod 56 drops and permits valve 500 to close.

In the double acting arrangement shown in Fig. 14, the heavy springs 51 and 510 are required when the apparatus is so worked that the pressure on the receding side of piston 20 is intended to fall below that in the communicating reservoir 12 or 47 as the case may be. Otherwise, said springs are not required.

It will be clear that except as regards cushioning the return stroke of the stamp, the cycle of operations beneath the piston is the same in principle as that carried out above the pistons. Therefore, the invention is not essentially varied by reversing the arrangement of Fig. 1, i. e., employing constant pressure above the stamp piston and applying varying pressure beneath said piston to reciprocate it and permitting first expulsion and then readmission of air from and to the space beneath the pistons, to prevent retardation of the stamp.

What I claim is:—

1. In a percussive apparatus, the process of delivering an uncushioned blow, which consists in supplying on one side of a piston having an accelerated velocity a fluid pressure which does not substantially increase during the percussive stroke; supplying a varying second fluid pressure, adapted to fall to a predetermined point, on the other side of said piston; partially preventing said second pressure from varying while being supplied to said piston; and supplying additional fluid from an external source directly on said other side of said piston to prevent the said varying pressure from falling below said point, substantially as described.

2. In a percussive apparatus, the process of delivering an uncushioned blow, which consists in supplying a constant fluid pressure on one side of a piston having an accelerated velocity; supplying a second varying fluid pressure, adapted to fall to a predetermined point, on the other side of said piston; partially preventing said second pressure from varying while being supplied to said piston; and supplying additional fluid from an external source directly on said other side of said piston to prevent the said varying pressure from falling below said point, substantially as described.

3. In a percussive apparatus, the process of delivering an uncushioned blow, which consists in supplying on one side of a piston having an accelerated velocity a fluid pressure which does not substantially increase during the percussive stroke; supplying a varying second fluid pressure adapted to fall to a predetermined point on the other side of said piston; partially preventing said second pressure from varying while being supplied to said piston; supplying additional fluid from an external source directly on said other side of said piston before the blow; and expelling said additional fluid to said external source after the blow, substantially as described.

4. In a percussive apparatus, the process of delivering an uncushioned blow and decreasing the dwell of the blow, which consists in supplying on one side of a piston a fluid pressure which does not substantially increase during the percussive stroke; supplying on the other side of said piston a varying second fluid pressure adapted to fall to a predetermined point; supplying from an external source additional fluid to prevent said second fluid pressure from falling below said predetermined point before the blow; expelling an equivalent amount of said additional fluid to said external source after the blow, and accelerating such expulsion of fluid, substantially as described.

5. In a percussive apparatus, the process of delivering an uncushioned blow and decreasing the dwell of the blow, which consists in supplying on one side of a piston a fluid pressure which does not substantially increase during the percussive stroke; supplying a varying second fluid pressure adapted to fall to a predetermined point on the other side of said piston; lessening the variation of said second pressure while being supplied to said piston; adding an additional fluid to said varying pressure to prevent the latter from falling below said point before the blow; abstracting an equal amount of fluid after the blow and increasing the period of dwell of the piston at the end of its return stroke, substantially as described.

6. In a percussive apparatus the combination of a cylinder; a piston working therein having an accelerated movement adapted to rarefy the fluid above said piston; a reciprocating means attached to said piston adapted to deliver a blow; a second means having a varying velocity for delivering compressed fluid above said piston to cause a relative movement between said piston and cylinder; means for increasing the velocity of said second means near one end of its stroke; and additional means for providing additional fluid above said piston to prevent the pressure above said piston being reduced below a predetermined point, substantially as described.

7. In a percussive apparatus the combination of a cylinder; a piston working therein having an accelerated movement adapted to rarefy the fluid above said piston; a reciprocating means attached to said piston adapted to deliver a blow; a second means having a varying velocity for delivering compressed fluid above said piston to cause a relative movement between said piston and cylinder; means for increasing the velocity of said second means near one end of its travel; additional means for providing additional fluid above said piston to prevent the pressure above said piston being reduced below a predetermined point before the blow; said second and said additional means adapted to cause the expulsion of an equal amount of fluid from above said piston after the blow; and means for increasing the dwell near the end of the return stroke of said piston, substantially as described.

8. In a percussive apparatus the combination of a cylinder; a reciprocating piston working therein; a reciprocating stamp head attached to said piston; means for delivering compressed fluid to said piston to cause relative movement between said piston and cylinder; a valve on one side of said piston adapted to close near the end of the upward stroke of the same; means for holding said valve open substantially throughout the blow stroke of said piston; and fluid controlled means for closing and opening said valve at predetermined times so as to cause the piston to dwell at the end of its upward stroke, substantially as described.

9. In a percussive apparatus the combination of a cylinder; a reciprocating piston working therein; a reciprocating stamp head attached to said piston; means for delivering compressed fluid to said piston to cause relative movement between said piston and cylinder; additional means for delivering additional compressed fluid at a predetermined time to one side of said piston, said means and said additional means adapted to subsequently cause the expulsion of an equal amount of fluid from above said piston; a valve on one side of said piston adapted to close near the end of the upward stroke of the same; means for holding said valve open substantially throughout the blow stroke of said piston; and fluid controlled means for closing and opening said valve at predetermined times, substantially as described.

10. In a percussive apparatus the combination of a cylinder; a piston working therein; a reciprocating stamp head attached to said piston; means comprising a second piston for compressing fluid to reciprocate said first mentioned piston; means for accelerating the movements of said second piston; a valve controlling the flow of fluid on one side of said first piston; and means for holding said valve open substantially throughout the blow stroke of said first mentioned piston, substantially as described.

11. In a percussive apparatus the combination of a cylinder; a piston therein; a reciprocating member fixed to said piston and having a stamp head; a second cylinder; a second piston in said second cylinder adapted to alternately compress and expand fluid to raise and lower said first piston; means to accelerate the movements of said second piston; means to retard the beginning of the stroke of said first piston; and means permitting the alternate re-expansions of said fluid in a closed circuit wholly within said apparatus, substantially as described.

12. In a percussive apparatus the combination of a cylinder; a piston therein; a stamp head fixed to said piston; a second cylinder; a second piston in said second cylinder adapted to alternately compress and expand fluid to raise and lower said first piston; means to accelerate the movements of said second piston; means to retard the beginning of the percussive stroke of said first piston; additional means for providing additional fluid to said first piston, said second piston and said additional means subsequently causing the expulsions of an equal amount of fluid from above said pistons; and means comprising a plurality of valves for controlling the re-expansions of said compressed fluid, substantially as described.

In testimony whereof, I affix my signature, in presence of two witnesses.

HANS CHARLES BEHR.

Witnesses:
E. R. DE VILLIERS,
J. MEYER.